US012643122B2

(12) United States Patent
Scraggs et al.

(10) Patent No.: US 12,643,122 B2
(45) Date of Patent: Jun. 2, 2026

(54) DEPOSITION OF SEALANT OR SIMILAR MATERIALS

(71) Applicant: THE UNIVERSITY OF SHEFFIELD, Sheffield (GB)

(72) Inventors: Chris Scraggs, Bristol (GB); George Sleath, Bristol (GB); Phil Kitchen, Bristol (GB)

(73) Assignee: THE UNIVERSITY OF SHEFFIELD, Sheffield (GB)

( * ) Notice: Subject to any disclaimer, the term of this patent is extended or adjusted under 35 U.S.C. 154(b) by 119 days.

(21) Appl. No.: 18/514,712

(22) Filed: Nov. 20, 2023

(65) Prior Publication Data

US 2024/0207887 A1 Jun. 27, 2024

(30) Foreign Application Priority Data

Dec. 21, 2022 (GB) ..................................... 2219429

(51) Int. Cl.

*B05B 13/04* (2006.01)
*B05C 5/02* (2006.01)
*B05C 11/02* (2006.01)
*B05C 11/10* (2006.01)

(52) U.S. Cl.

CPC ........ *B05C 5/0295* (2013.01); *B05B 13/0431* (2013.01); *B05C 5/0254* (2013.01); *B05C 5/0262* (2013.01); *B05C 11/1005* (2013.01); *B05C 11/1021* (2013.01); *B05C 11/1039* (2013.01); *B05C 11/023* (2013.01)

(58) Field of Classification Search

None

See application file for complete search history.

(56) References Cited

U.S. PATENT DOCUMENTS 5,670,182 A 9/1997 Mower
5,695,788 A 12/1997 Woods
5,769,947 A * 6/1998 Krappweis .............. B05C 5/027 118/223
5,770,129 A * 6/1998 Monti ................. B05C 11/1005 425/141

(Continued)

FOREIGN PATENT DOCUMENTS

EP 2 397 860 A1 12/2011

OTHER PUBLICATIONS

Partial European Search Report for Application No. EP 23218466, five pages, dated Oct. 4, 2024.

(Continued)

*Primary Examiner* — Binu Thomas
(74) *Attorney, Agent, or Firm* — Nixon & Vanderhye, PC

(57) ABSTRACT

An applicator for the deposition of sealant onto a surface of a workpiece is disclosed including at least one inlet for depositing sealant on to a surface or a nozzle-receiving space for receiving a nozzle comprising at least one inlet for depositing sealant on to a surface; at least one sealant-contacting surface for contacting sealant deposited onto the surface through the inlet as the applicator is moved across said surface, thereby forming a film of sealant on the surface; at least one spacer for contacting a surface onto which sealant is to be deposited and for maintaining the sealant-contacting surface in spaced relationship with the surface; the applicator being configured to facilitate the formation of films of different widths.

19 Claims, 4 Drawing Sheets

(56) References Cited

U.S. PATENT DOCUMENTS

| | | | | |
|---|---|---|---|---|
| 5,853,482 | A | 12/1998 | Gartmann et al. | |
| 6,565,660 | B1 * | 5/2003 | Wagner | B05C 5/0266 118/712 |
| 10,315,215 | B2 | 6/2019 | Higgins et al. | |
| 2008/0000418 | A1 * | 1/2008 | Ooshima | B05C 5/0254 118/118 |
| 2015/0224700 | A1 * | 8/2015 | Loukusa | B05C 11/1005 425/141 |
| 2016/0296951 | A1 | 10/2016 | Higgins et al. | |
| 2017/0100740 | A1 * | 4/2017 | Pentland | B05C 5/0254 |
| 2020/0353500 | A1 * | 11/2020 | Kim | B05C 5/0254 |
| 2023/0302488 | A1 | 9/2023 | Brookes et al. | |

OTHER PUBLICATIONS

European Search Report for Application No. EP 23218472, four pages, dated Oct. 7, 2024.
Search Report for GB2219429.4 dated Jul. 4, 2023, 1 page.
Search Report for GB2219436.9 dated Jun. 27, 2023, 1 page.

* cited by examiner

DEPOSITION OF SEALANT OR SIMILAR MATERIALS

CROSS RELATED APPLICATION

This application claims priority to United Kingdom Patent Application GB 2219429.4, filed Dec. 21, 2022, the entire contents of which is hereby incorporated by reference.

BACKGROUND OF THE INVENTION

The present disclosure relates to the deposition of sealant and similar materials.

The present invention concerns the deposition of sealant and similar materials. More particularly, but not exclusively, this invention relates to an applicator for the deposition of sealant onto a surface of a workpiece. The invention also concerns an apparatus for the deposition of sealant onto a surface of a workpiece and a method of depositing sealant.

Traditionally, sealant has been dispensed onto a workpiece using a nozzle attached to source of sealant. An operator would draw the nozzle over the surface of the workpiece at the desired speed, forming a bead of sealant. The width of the deposited bead would primarily depend on the width of the nozzle; the wider the nozzle, the wider the bead of sealant deposited on the surface of the workpiece. In order to deposit a bead of different width, a nozzle of different width would be used in a second deposition process. This makes the deposition process time-consuming, and requires the user to have access to nozzles of different widths.

The present invention seeks to mitigate the above-mentioned problems. Alternatively or additionally, the present invention seeks to provide improved deposition of sealant, optionally onto a surface of a workpiece.

SUMMARY OF THE INVENTION

In accordance with a first aspect of the present invention, there is provided an applicator for the deposition of sealant onto a surface of a workpiece, the applicator comprising:

- at least one inlet for depositing sealant on to a surface or a nozzle-receiving space for receiving a nozzle comprising at least one inlet for depositing sealant on to a surface;
- at least one sealant-contacting surface for contacting sealant deposited onto the surface through the inlet as the applicator is moved across said surface, thereby forming a film of sealant on said surface;
- at least one spacer for contacting a surface onto which sealant is to be deposited and for maintaining the sealant-contacting surface in spaced relationship with the surface;
- the applicator being configured to facilitate the formation of films of different widths.

The applicator may comprise a plurality of inlets, the inlets being configured to facilitate the formation of films of different widths. For example, the applicator may comprise a plurality of inlets, arranged laterally across the applicator. Optionally, at least one, optionally more than one and optionally each inlet may be elongate. Such an elongate inlet may be arranged laterally, the long axis of the inlet being normal to the intended direction of motion of the applicator, and configured to be substantially parallel to a surface on which the film is to be deposited.

Such sealants may optionally be workable at room temperature, and may comprise or be a curable material. The sealant may optionally be curable to a final state, such that the sealant is flexible in the final state. Such sealants are typically non-metallic.

The applicator may comprise at least one inlet reservoir for receiving sealant from at least one inlet. The applicator may comprise a plurality of inlet reservoirs for receiving sealant. The plurality of inlet reservoirs may optionally be configured to facilitate the formation of films of different widths. The user can select a width of sealant to be deposited by supplying sealant to selected inlet reservoirs. At least two and optionally all of the inlet reservoirs may be located laterally across the applicator.

At least one, optionally more than one and optionally each inlet reservoir has an open face for placement proximate to the surface on to which sealant is to be deposited.

The applicator may comprise more than one inlet reservoir. If there is more than one inlet reservoir, then adjacent inlet reservoirs may be separated by a partition, or similar obstruction, to inhibit movement of sealant between inlet reservoirs. For example, the applicator may comprise a first inlet reservoir and a second inlet reservoir separated by a first partition. The applicator may optionally comprise a third inlet reservoir, optionally separated from the second inlet reservoir by a second partition. The applicator may comprise a plurality of laterally-spaced inlet reservoirs. The lateral dimension (width) of the inlet reservoirs may be the same or different. The provision of more than one inlet reservoir facilitates the deposition of films of different widths using one applicator.

Optionally, the applicator may comprise more than one inlet for depositing sealant onto a surface.

Optionally, an inlet reservoir may be configured to receive sealant from more than one inlet. Optionally, an inlet reservoir may be configured to receive sealant from one, and only, one inlet.

Optionally, at least one, optionally more than one and optionally each inlet reservoir may be configured to provide a covered space when the applicator is in contact with a surface onto which sealant is to be deposited. The applicant has discovered that the provision of an inlet reservoir for receiving sealant that provides a covered space helps retain sealant and inhibits loss of the sealant from the applicator. Furthermore, the covering of the reservoir enables the applicator to be used in an inverted or otherwise non-upright orientation without sealant being lost from the applicator. The shape and size of an inlet reservoir may be configured so that a reasonable amount of sealant may accumulate in the inlet reservoir, which may help if a greater amount than expected of sealant is delivered to the inlet reservoir.

The applicator may comprise an applicator main body. The applicator main body may comprise one or more of: at least one inlet for depositing sealant on to a surface or a nozzle-receiving space for receiving a nozzle comprising at least one inlet for depositing sealant on to a surface; at least one sealant-contacting surface for contacting sealant deposited onto the surface through the inlet as the applicator is moved across said surface, thereby forming a film of sealant on said surface; at least one spacer for contacting a surface onto which sealant is to be deposited and for maintaining the sealant-contacting surface in spaced relationship with the surface; and at least one inlet reservoir for receiving sealant from at least one inlet, the inlet reservoir being configured to provide a covered space when the applicator is in contact with a surface onto which sealant is to be deposited.

The applicator optionally comprises at least one overflow outlet for the egress of excess sealant from an inlet reservoir, the overflow outlet being in fluid communication with an inlet reservoir. At least one, optionally more than one, and optionally each inlet reservoir may be in fluid communication with at least one such overflow outlet. The applicator optionally comprises a plurality of such overflow outlets, each overflow outlet being in fluid communication with an inlet reservoir. At least one, optionally more than one and optionally each inlet reservoir may be in fluid communication with a plurality of overflow outlets. Optionally, a plurality of overflow outlets that are in communication with an inlet reservoir may be evenly spaced. At least one, optionally more than one and optionally each overflow outlet may provide a flow constrictor in a fluid flow path out of an inlet reservoir. For example, a fluid flow path out of an inlet reservoir may comprise an overflow outlet in a fluid flow path between a conduit and the inlet reservoir, the cross-sectional area of the overflow outlet being smaller than that of the conduit. The overflow outlet therefore forms a flow constrictor. The flow constrictor inhibits unwanted leakage of sealant from the applicator, while permitting egress of sealant in the event of too high a pressure in the inlet reservoir.

At least one, optionally more than one, and optionally each overflow outlet is optionally located forward of the respective inlet reservoir. At least one, optionally more than one, and optionally each overflow outlet is optionally in communication with the respective inlet reservoir at a forward part of the inlet reservoir. For the avoidance of doubt, in this context "forward" is defined in relation to the intended direction of use of the applicator. In this connection, the inlet reservoir(s) would typically be located forward of the sealant-contacting surfaces. At least one, optionally more than one and optionally each overflow outlet may optionally be configured to be remote from a surface onto which sealant is to be deposited. In this connection, the applicator may be configured so that at least one, optionally more than one and optionally each inlet is more proximate to a surface onto which sealant is to be deposited than at least one, optionally more than one and optionally each overflow outlet.

The applicator optionally comprises at least one overflow reservoir for receiving excess sealant from at least one overflow outlet. Optionally, at least one, optionally more than one and optionally each overflow outlet is in fluid communication with an overflow reservoir. The application optionally comprises more than one such overflow reservoir.

At least one, optionally more than one and optionally each inlet reservoir is optionally in fluid communication with an overflow reservoir. Optionally, there is at least one, optionally more than one and optionally a plurality of fluid flow paths from the overflow reservoir(s) to an overflow reservoir. A flow constrictor is optionally provided in a fluid flow path between at least one inlet reservoir and an overflow reservoir. Such flow constrictors inhibit unwanted leakage of sealant from the applicator (typically at low pressures), but permit egress of sealant from an inlet reservoir if the pressure in an inlet reservoir is too high. Optionally, more than one and optionally each such fluid flow path is provided with a flow constrictor. An overflow outlet may provide a flow constrictor. In this connection, the cross-sectional area of the overflow outlet may be lower than the cross-sectional area of the fluid flow path from the overflow outlet to the overflow reservoir.

The overflow reservoir optionally retains excess sealant, and inhibits unwanted leaking of sealant from the applicator.

At least one, optionally more than one and optionally each overflow reservoir optionally comprises one or more surfaces for retaining excess sealant. For example, at least one, optionally more than one and optionally each overflow reservoir optionally comprises a trough for the receipt, and retention of, excess sealant. Such a trough is optionally elongate. Such a trough may run parallel to the width of the applicator. For example, a longitudinal axis of the trough may be normal to a longitudinal axis of the applicator (and normal to the intended direction of use of the applicator). Such a trough may optionally comprise one or more trough walls to facilitate retention of excess sealant. The trough may comprise a first wall, and a second wall portion that projects from the first wall portion, optionally substantially normal to the first wall portion. The trough may comprise a third wall portion that optionally projects from the second wall portion, optionally from an end of the second wall portion remote from the end of the second wall portion that projects from the first wall portion. The third wall portion may optionally project substantially normal to the second wall portion. The third wall portion may optionally form a lip that projects from the second wall portion. The trough may comprise at least one lateral trough wall that inhibits loss of excess sealant.

At least one, optionally more than one and optionally each overflow reservoir may be located forward of at least one, optionally more than one, and optionally cach inlet reservoir. For the avoidance of doubt, in this context "forward" is defined in relation to the intended direction of use of the applicator. In this connection, the inlet reservoir(s) would typically be located forward of the sealant-contacting surfaces.

Optionally, at least one, optionally more than one and optionally each sealant-contacting surface is provided with at least one spacer for contacting a surface onto which sealant is to be deposited and for maintaining the sealant-contacting surface in spaced relationship with the surface on which sealant is to be deposited. Optionally, more than one sealant-contacting surface is provided with at least one such spacer. Optionally, at least one sealant-contacting surface is substantially devoid of such spacers. Optionally, a rearmost sealant-contacting surface is substantially devoid of such spacers. Such an arrangement facilitates the smoothing out of any furrows that such spacers produce in a film.

At least one, optionally more than one and optionally each spacer may be in the form of an optionally squat projection. At least one, optionally more than one and optionally each projection may project from a sealant-contacting surface. At least one, optionally more than one and optionally each projection may be hemispherical, a segment of a sphere, conical, frusto-conical, cylindrical or cuboid. The applicator may comprise a plurality of squat projections that project from a respective sealant-contacting surface for maintaining the sealant-contacting surface in spaced relationship with the surface.

At least one, optionally more than one and optionally each sealant-contacting surface extends across a width of the applicator. Optionally, multiple sealant-contacting surfaces are mutually spaced along a length of the applicator. A length of the applicator may be determined along a longitudinal direction of the applicator, as determined by the intended direction of movement of the applicator. A space for the collection of sealant may be provided between adjacent sealant-contacting surfaces. Such spaces may facilitate the collection of sealant, which may be advantageous if excessive amounts of sealant are being provided to the applicator. Such a space may be substantially parallel to the sealant-contacting surfaces, and optionally have a longitudinal axis normal to the length of the applicator. Such a space may be provided with one or more dividers to inhibit lateral movement of sealant within said space, the dividers forming a plurality of sub-spaces. The lateral position of a sub-space may correspond to a lateral position of an inlet reservoir immediately in front of the sub-space. In this manner, the width of a film deposited by introducing sealant into a particular selection of inlet reservoirs can be controlled.

An applicator may, for example, comprise first and second inlet reservoirs configured to receive sealant from first and second inlets, respectively. First and second inlet reservoirs may be of different widths, a first inlet reservoir width and a second inlet reservoir width, respectively. The applicator may comprise first and second sealant-contacting surfaces spaced along the length of the applicator. A first space for the receipt of sealant is optionally formed between the first and second sealant-contacting surfaces. A divider may be provided, thereby separating the space into a first sub-space and a second sub-space. The width of the first sub-space is optionally the same as the first inlet reservoir width and the width of the second sub-space is optionally the same as the second inlet reservoir width. The lateral location of the first sub-space is optionally substantially the same as the lateral location of the first inlet reservoir. The lateral location of the second sub-space is optionally substantially the same as the lateral location of the second inlet reservoir.

The applicator may comprise a third sealant-contacting surface spaced along the length of the applicator from, and to the rear of, the second sealant-contacting surface. A second space for the receipt of sealant is optionally provided between the second sealant-contacting surface and the third sealant-contacting surface. A divider may be provided, thereby separating the second space into a third sub-space and a fourth sub-space. The width of the third sub-space is optionally the same as the first inlet reservoir width and the width of the fourth sub-space is optionally the same as the second inlet reservoir width. The lateral location of the third sub-space is optionally substantially the same as the lateral location of the first inlet reservoir. The lateral location of the fourth sub-space is optionally substantially the same as the lateral location of the second inlet reservoir.

At least one, optionally more than one and optionally each sealant-contacting surface may comprise a flat portion. At least one, optionally more than one and optionally each flat portions may be provided with one or more spacers (for example, squat projections) that extend away from said flat portion. Optionally, at least one flat portion, and optionally the rearmost flat portion, may be substantially devoid of spacers.

At least one, optionally more than one and optionally each sealant-contacting surface may be provided by a baffle. At least one, optionally more than one and optionally each baffle may comprise a curved surface. At least one, optionally more than one and optionally each baffle may comprise a flat surface, optionally configured to be adjacent to a surface on which sealant is to be deposited. At least one, optionally more than one and optionally each flat surface may be provided with one or more spacers that extend away from said flat surface.

The applicator may comprise one or more lateral walls to inhibit egress of sealant from the applicator. The applicator may comprise one or more lateral walls to inhibit egress of sealant from one or more inlet reservoirs.

The applicator may comprise at least one, and optionally more than one, nozzle for depositing sealant. At least one, optionally more than one and optionally each nozzle is typically configured to receive sealant from a source of sealant. At least one, optionally more than one and optionally each nozzle may comprise an inlet for depositing sealant on a surface, or may be configured to deliver sealant to one or more inlets. One nozzle may provide at least one, optionally more than one and optionally each inlet. Alternatively, the applicator may comprise a plurality of nozzles, each of which is configured to deliver sealant to one (and only one) inlet. The applicator of the first aspect of the present invention is typically suitable for forming a film of sealant on a surface of a workpiece. The workpiece may optionally be a vehicle component, such as an aircraft component. The applicator of the first aspect of the present invention are optionally suitable for sealing a gap between two different workpieces.

In accordance with a second aspect of the invention there is also provided a method of forming a film on a surface of a workpiece, the method comprising:

sensing a width of the surface;

contacting sealant with the surface; and moving at least one sealant-contacting surface over the sealant, thereby forming a film on the surface, the width of said film depending on the sensed width of the surface.

The applicant has discovered that it is possible to deposit a film of sealant onto a surface by sensing a width of a surface, contacting sealant with the surface and then moving a sealant-contacting surface over the sealant to form a film of a desired width that depends on the sensed width of the surface. The method is particularly beneficial for use with surfaces that have different widths.

Contacting sealant with the surface may comprise depositing sealant onto the surface.

The surface may optionally be a surface of a vehicle component, optionally an aircraft component.

The sealant may be substantially as described above in relation to the applicator of the first aspect of the present invention. The sealant is optionally deposited as a liquid. The sealant may comprise a curable liquid.

For the avoidance of doubt, the term "sensing" indicates that the width of the surface is sensed using one or more sensors.

The method may comprise sensing a width of the surface using electromagnetic radiation. The method may comprise transmitting electromagnetic radiation onto said surface, and receiving electromagnetic radiation, and from the received electromagnetic radiation determining a width of the surface.

For example, a sensor comprising a line laser may be used.

Optionally, the width of the sealant deposited onto the surface may depend on the sensed width of the surface.

The method may comprise sensing a width of a portion of the surface, and forming a film on said portion of the surface, the width of the film formed on said portion of said surface depending on the sensed width of the portion of the surface. The width of the film may optionally be less than the width of said portion of the surface, optionally the same as the width of said portion of the surface or optionally greater than the width of said portion of the surface.

As mentioned above, the film is formed by moving at least one sealant-contacting surface over the sealant. The movement direction of the sealant-contacting surface may be considered to be a forwards direction. The method may comprise sensing a width of a portion of the surface in front of the sealant-contacting surface(s). The distance between the portion of the surface and the sealant-contacting surface may depend, inter alia, on the speed that the sealant-contacting surface is moved over the workpiece surface, the thickness of the film required and the rate at which sealant is delivered onto the surface on which the film is to be formed.

The surface on which the film is to be formed may have any orientation. The orientation of the surface will typically be dictated by the nature of that surface. In some circumstances, it may be possible to move a component comprising said surface into a desired location and orientation to facilitate deposition of the film. Alternatively, it may not be possible to move the surface into a desired orientation and/or location due to the nature and/or size of the workpiece. For example, the surface on which the film is to be formed may face substantially downwards.

If the surface is a downward-facing surface, for example, in which an applicator may be used in an inverted orientation, contacting sealant with the surface may comprise at least partially filling an inlet reservoir with sealant. As the inlet reservoir is filled, the level of sealant in the inlet reservoir rises and the sealant contacts the surface on which a film is to be formed. Such an inlet reservoir may be provided by an applicator. The applicator may comprise the one or more spacers and/or the sealant-contacting surface.

The method may comprise urging the one or more spacers into contact with the surface onto which a film is to be deposited. The method may comprise maintaining contact between the one or more spacers and the surface onto which a film is to be formed. The method may comprise biasing the one or spacers into contact with the surface onto which a film is to be formed. Such biasing may comprise use of a biasing member, such as a piston, spring or piece of foam. Biasing of the one or more spacers into contact with the surface on to which a film is to be formed is beneficial because it ensures that a film of uniform thickness is deposited onto the surface, and mitigates against any misalignment of the sealant-contacting surface relative to the workpiece.

The method may comprise:

sensing a first width of said surface;

contacting sealant with the surface;

moving at least one sealant-contacting surface over the sealant, thereby forming a film having a first width on the surface, the first width of said film depending on the first sensed width of said surface;

sensing a second width of said surface;

contacting sealant with the surface; and moving at least one sealant-contacting surface over the sealant, thereby forming a film having a second width on the surface, the second width of said film depending on the second sensed width of said surface.

The method may comprise moving a plurality of sealant-contacting surfaces over the liquid, thereby forming a film on the surface of the workpiece.

The thickness of the film on the surface may be determined by a spacing between the sealant-contacting surface and the surface on which the film is formed. One or more spacers may be provided for maintaining a sealant-contacting surface in spaced relationship to the surface on which the film is to be formed. Optionally, at least one, optionally more than one and optionally each sealant-contacting surface may be provided with one or more spacers for maintaining a sealant-contacting surface in spaced relationship to the surface on which the film is to be formed.

The method may comprise depositing sealant onto the surface through one or more nozzles, optionally through more than one nozzle. The deposition of sealant through one or more of said nozzles, and optionally through more than one of said nozzles, and optionally through the plurality of said nozzles, is optionally controlled depending on a sensed width of the surface. Optionally, two or more and optionally all of said plurality of nozzles may be arranged width-wise in a direction parallel to a width of the surface. For example, if a sensed width is relatively narrow, then sealant could optionally be deposited onto the surface using one nozzle. Alternatively, if a sensed width is relatively wide, then sealant could optionally be deposited onto the surface using two (or more) nozzles. Optionally, if there are more than nozzle, then the width of a first nozzle may be greater than a width of a second nozzle. In this manner, three different widths of film may be formed, using the first and second nozzles separately and the first and second nozzle together.

Each nozzle may comprise at least one, and optionally more than one, opening for the egress of sealant. Such an opening may be elongate, for example. The elongate opening may optionally by parallel to the surface onto which sealant is to be deposited. The elongate opening may extend across the width of the surface onto which sealant is to be deposited. Optionally, a nozzle may comprise a plurality of openings for the egress of sealant. The plurality of opening may optionally be arranged in a linear array. The linear array may optionally be parallel to the surface onto which sealant is to be deposited. The linear array may extend across the width of the surface onto which sealant is to be deposited.

The method of the present invention may comprise use of an applicator. The applicator may comprise one or more sealant-contacting surfaces and/or one or more spacers for maintaining a sealant-contacting surface in spaced relationship to the surface on which the film is to be formed. Use of an applicator may facilitate simple and effective film formation. The method may comprise moving an applicator relative to the surface on to which the film is to be formed, thereby moving the one or more sealant-contacting surface over sealant deposited onto the surface, thereby forming a film on the surface of the workpiece.

The applicator used in the method of the second aspect of the present invention may comprise one or more of the features of the applicator of the first aspect of the present invention.

For example, the applicator may comprise a plurality of inlets for depositing sealant on to a surface on which the film is to be formed, the inlets being configured to facilitate the formation of films of different widths. For example, the applicator may comprise a plurality of inlets, arranged laterally across the applicator. Optionally, at least one, optionally more than one and optionally each inlet may be elongate. Such an elongate inlet may be arranged laterally, the long axis of the inlet being normal to the intended direction of motion of the applicator, and configured to be substantially parallel to a surface on which the film is to be deposited.

The applicator may comprise at least one inlet reservoirs for receiving sealant from at least one inlet. The applicator may comprise a plurality of inlet reservoirs for receiving sealant. The user can select a width of sealant to be deposited by supplying sealant to selected inlet reservoirs. At least two and optionally all of the inlet reservoirs may be located laterally across the applicator.

At least one, optionally more than one and optionally each inlet reservoir has an open face for placement proximate to the surface on to which sealant is to be deposited.

The applicator may comprise more than one inlet reservoir. If there is more than one inlet reservoir, then adjacent inlet reservoirs may be separated by a partition, or similar obstruction, to inhibit movement of sealant between inlet reservoirs. For example, the applicator may comprise a first inlet reservoir and a second inlet reservoir separated by a first partition. The applicator may optionally comprise a third inlet reservoir, optionally separated from the second inlet reservoir by a second partition. The applicator may comprise a plurality of laterally-spaced inlet reservoirs. The lateral dimension (width) of the inlet reservoirs may be the same or different. The provision of more than one inlet reservoir facilitates the deposition of films of different widths using one applicator.

The applicator may comprise one or more inlet reservoirs for the receipt of liquid. The method may comprise dispensing liquid into one or more inlet reservoirs, and into contact with said surface onto which a film is to be formed. At least one, optionally more than one and optionally each of the inlet reservoirs may be covered to inhibit loss of liquid from the applicator. Such an arrangement facilitates the use of an applicator in an inverted orientation. The method may comprise moving the applicator, thereby forming the film.

The method may therefore comprise depositing liquid into a plurality of inlet reservoirs. The method may comprise dispensing liquid into one or more of said plurality of inlet reservoirs dependent on a sensed width.

The method may be used to seal a gap between two different workpieces.

The method may comprise use of an apparatus in accordance with a third aspect of the present invention, as described below.

In accordance with a third aspect of the present invention there is also provided an apparatus for forming a film of sealant on a surface of a workpiece, the apparatus comprising:

one or more sensors for sensing a width of a surface of a workpiece;

a means of moving a mounted applicator for forming a film on a surface of a workpiece such that a mounted applicator is movable along a surface of a workpiece;

a plurality of outlets for supplying sealant to corresponding sealant inlets provided in an applicator; and one or more sealant supply means for moving sealant from a source of sealant to said outlets, the apparatus being configured to supply sealant to one or more of the plurality of outlets dependent on a sensed width of a surface of the workpiece as determined by one or more of the sensors.

Control of the supply of sealant to the plurality of outlets facilitates the production of films of different widths, for example, by selective delivery of sealant to one or more of multiple reservoirs, and/or by selective delivery of sealant to one or more of multiple nozzles and/or outlets. Those skilled in the art will realise that while the apparatus of the present invention is used with an applicator, the applicator is not necessarily part of the apparatus of the present invention. In this connection, it is anticipated that the applicator will be replaceable and/or disposable. Those skilled in the art will realise that the source of sealant is not necessarily part of the apparatus of the present invention.

The apparatus may optionally comprise a plurality of sealant supply means, one for each outlet. Each sealant supply means may be individually controllable to provide sealant to a particular outlet. Alternatively, the apparatus may comprise sealant supply means configured to supply sealant to each of the outlets. In this connection, each of the outlets may be provided with a valve or other flow-controller that may be used to control the flow of sealant to an applicator inlet.

The apparatus may optionally comprise an applicator.

The apparatus may be configured to forming a film of sealant on a surface of a vehicle component, such as an aircraft component.

The apparatus may optionally comprise one or more sources of sealant.

The apparatus may comprise an applicator mount for mounting an applicator.

At least one, optionally more than one and optionally all of the sensors may be configured so that the sensors move as a mounted applicator moves.

At least one, optionally more than one and optionally each of the sensors is operable to emit electromagnetic radiation and sense electromagnetic radiation, the sensed radiation determining a width of the surface.

The apparatus may comprise a biasing means for urging a mounted applicator into contact with a surface on to which a film is to be formed. The biasing means may comprise a piston, piece of foam or spring. Biasing of an applicator into contact with the surface on to which a film is to be formed is beneficial because it ensures that a film of uniform thickness is deposited onto the surface, and mitigates against any misalignment of the sealant-contacting surface relative to the workpiece. The bias means may be provided by a compliance module. The compliance module may, for example, provide an applicator mount for mounting an applicator.

The apparatus may comprise a means for moving a mounted applicator in a direction normal to a workpiece surface consistent with moving any associated applicator into, and out of, contact with a workpiece surface. The apparatus of the third aspect of the present invention is optionally suitable for sealing a gap between two different workpieces.

It will, of course, be appreciated that features described in relation to one aspect of the present invention may be incorporated into other aspects of the present invention. For example, the method of the invention may incorporate any of the features described with reference to the apparatus of the invention and vice versa.

DETAILED DESCRIPTION

Figure 1:
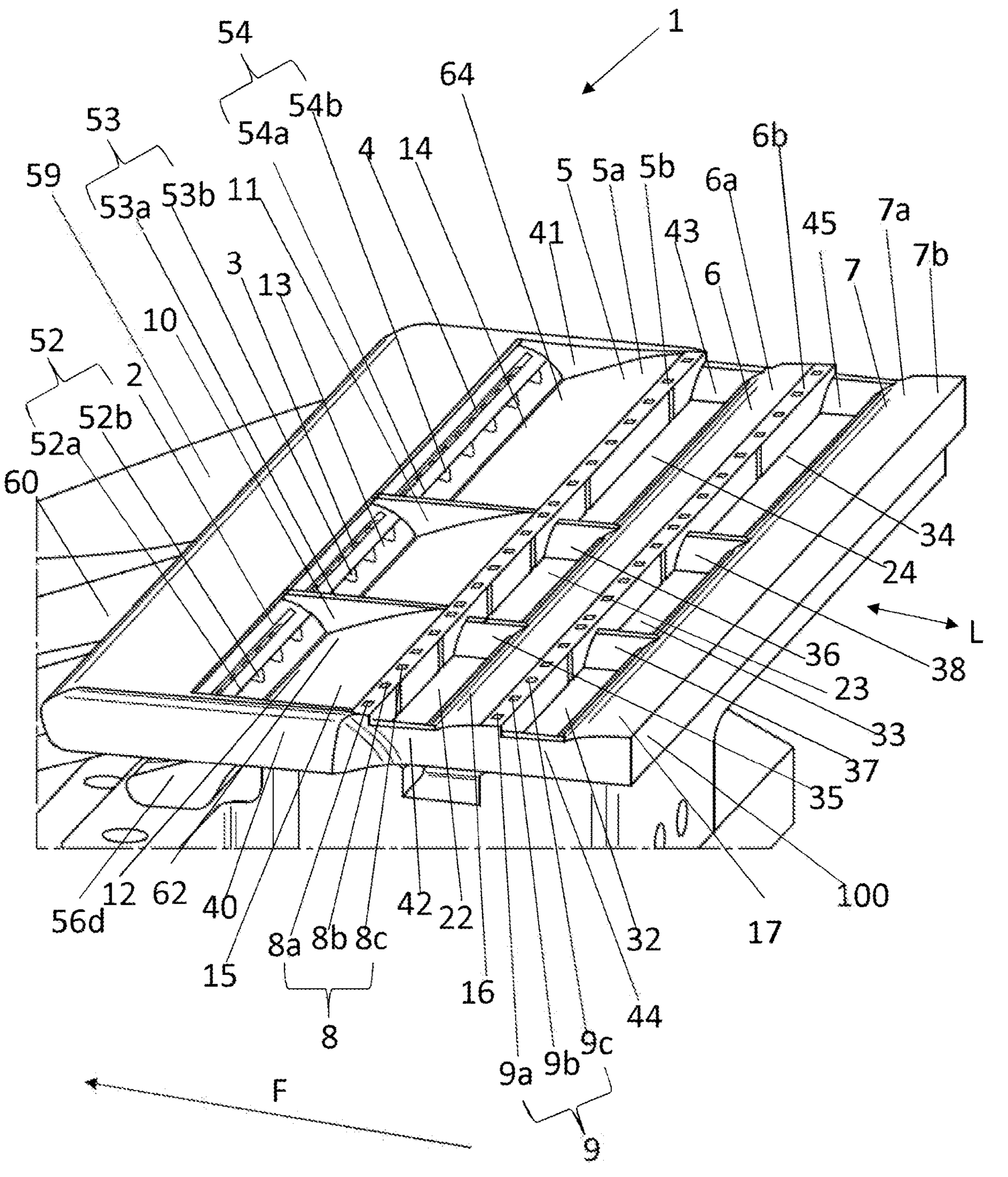
FIG. 1 shows a perspective view of the underside of an example of an embodiment of an applicator in accordance with the first aspect of the present invention.
Figure 2:
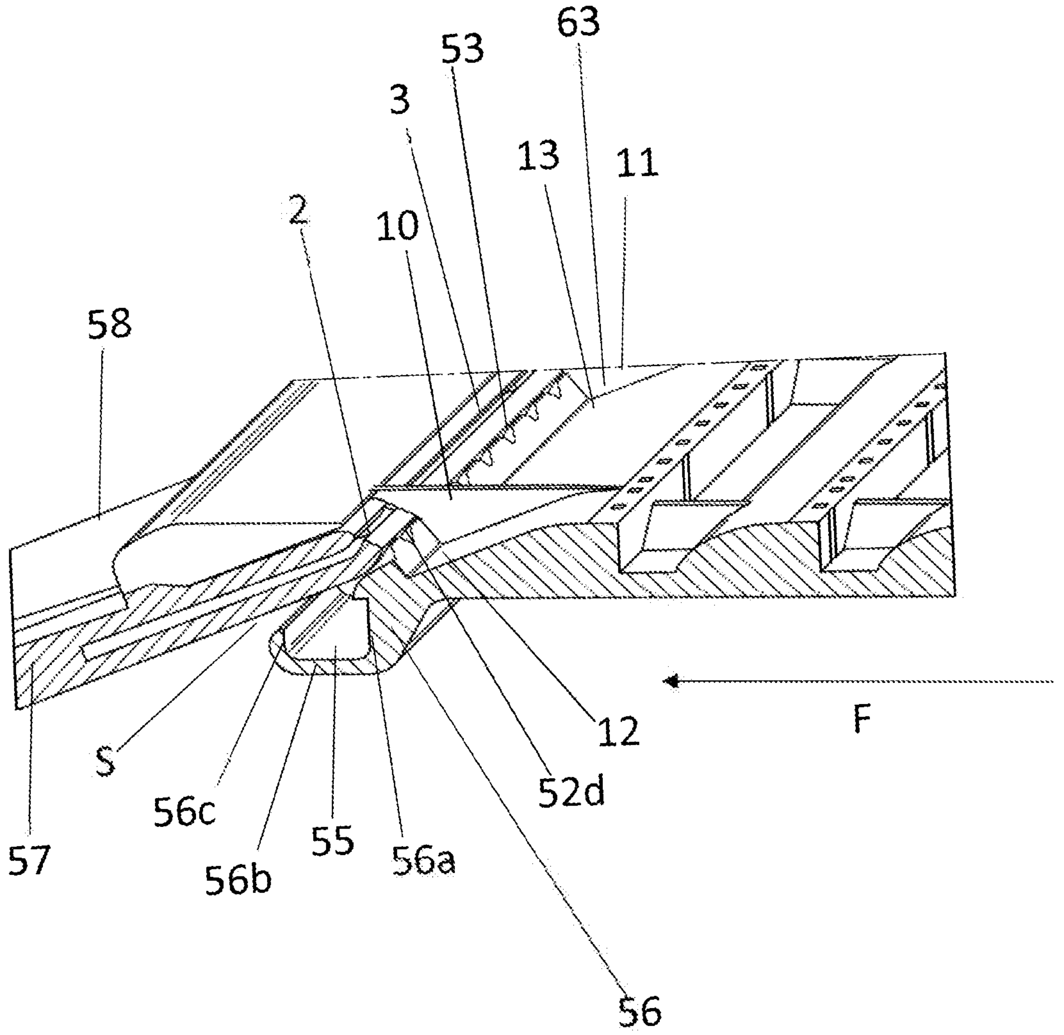
FIG. 2 shows a cross-sectional perspective view of part of the applicator of FIG. 1.

FIGS. 1 and 2 shows perspective views of the underside of applicator 1 in accordance with the first and second aspects of the present invention. FIG. 2 is a cross-sectional perspective view. The applicator 1 comprises three inlets 2, 3, 4 for depositing sealant on to a surface. The applicator comprises an applicator main body 100, which comprises three sealant-contacting surfaces 5, 6, 7 for contacting sealant deposited onto the surface through the inlet as the applicator is moved across said surface. Essentially, sealant is deposited through inlets 2, 3, 4 into a respective inlet reservoir 12, 13, 14 and onto a surface on which a film of sealant is to be formed. Spacers, in the form of projections (some of which are labelled 8*a, b, c*. 9*a, b, c*) contact the surface onto which the sealant is deposited and maintain the sealant-contacting surfaces 5, 6, 7 at a predetermined spacing from the surface. The applicator 1 is moved in a forwards motion, shown generally by reference numeral F. This movement causes the sealant-contacting surfaces 5, 6, 7 to move over the sealant deposited through inlets 2, 3, 4, thereby forming a film of sealant, the thickness of the film of sealant being determined by, amongst other things, the spacing between the sealant-contacting surfaces 5, 6, 7 and the surface on which the film of sealant is formed. The applicator 1 comprises three inlet reservoirs 12, 13, 14, each of which receives sealant from a respective inlet 2, 3, 4. Each inlet reservoir 12, 13, 14 is configured to provide a covered space when the applicator is in contact with a surface onto which sealant is to be deposited. The covered space allows the applicator to be used in an inverted orientation, inhibiting loss of sealant from that space. Each inlet reservoir 12, 13, 14 comprises an open face 62, 63, 64 that is, in use, placed proximate the surface onto which sealant is to be deposited. The use of multiple inlets and associated inlet reservoirs facilitates the production of films of different width. For example, by supplying sealant through inlets 2, 3 and 4 a film having a width approximately corresponding to the width of the whole applicator may be deposited. Narrower films may be formed by supplying sealant to any one or two of inlets 2, 3, 4. Furthermore, in the present case, inlet 4 and inlet reservoir 14 are each wider than their respective counterpart inlets 2, 3 and inlet reservoirs 12, 13. This facilitates even greater control of the width of the film deposited using the applicator 1 of the present invention.

The volume of each inlet reservoir 12, 13, 14 facilitates the storage of a reasonable volume of sealant in the reservoir. This ensures that there is sufficient sealant in a reservoir to help facilitate the deposition of a uniform film, particularly if the applicator 1 is used in an inverted orientation.

Each inlet reservoir 12, 13, 14 is provided with a respective set 52, 53, 54 of overflow outlets, some of which are labelled 52*a, b, d*, 53*a, b*, 54*a, b*. Each overflow outlet is substantially triangular in cross-section, and is in communication with an outlet flow channel (not shown) that leads from the overflow outlet to a position above an overflow reservoir 55 (best seen in FIG. 2). If excess sealant is delivered to an inlet reservoir, then sealant passes through the respective overflow outlets, through the respective outlet flow channels into the overflow reservoir. The overflow reservoir 55 retains the excess sealant and prevents it from dropping from the applicator when the applicator is used in an inverted orientation, as shown in FIGS. 1 and 2. Each overflow outlet 52*a, b, d*, 53*a, b*, 54*a, b* inhibits unwanted leakage of sealant from the respective inlet reservoir 12, 13, 14, while permitting passage of sealant in the event that the pressure in the inlet reservoir exceeds a certain level. The overflow outlets provide a narrowing in the flow path between an inlet reservoir and the overflow reservoir, inhibiting unwanted leakage from the applicator, while permitting egress of sealant in the event that the pressure in the inlet reservoir becomes too high.

The overflow reservoir 55 is provided by a trough 56, which is formed by first 56*a*, second 56*b*, and third 56*c* trough walls. The overflow reservoir 55 and hence trough 56 are located towards the front of the applicator and are located forwards of the three inlet reservoirs 12, 13, 14. Trough 56 extends across the width of applicator 1, normal to the direction of intended movement F of the applicator 1 and normal to a longitudinal axis L of applicator 1. First trough wall 56*a* extends away from the main body 100 of the applicator 1. Second trough wall 56*b* extends from an end of the first trough wall 56*a* remote from the main body 100. Third trough wall 56*c* extends from an end of the second trough wall 56*b* remote from its attachment to the first trough wall 56*a*. Third trough wall 56*c* is relatively short, effectively forming a lip to help retain excess sealant in the trough 56. Referring to FIG. 2, the relatively small height of third trough wall 56*c* provides a space S that facilitates insertion of nozzles 57, 58, 59 into main body 100 of the applicator. Referring to FIG. 1, a trough end wall 56*d* is provided on each end of the trough 56 to help retain excess sealant when the applicator is used in an inverted orientation.

Applicator 1 comprises three nozzles 57, 58, 59 in a unitary nozzle attachment 60. Nozzle attachment 60 is located in a slot provided in applicator main body 100. Each nozzle 57, 58, 59 provides a respective inlet 2, 3, 4 to provide sealant to the applicator 1. Each inlet 2, 3, 4 is slot-shaped and is elongate, and extends across the width of a respective inlet reservoir 12, 13, 14. This arrangement facilitates provision of sealant across substantially the entire width of a reservoir, and facilitates the formation of a film of uniform width. Each nozzle 57, 58, 58 is attached to a separate source of sealant (not shown) and is provided with a separate means of urging the sealant to the respective nozzle. This means that sealant may be delivered separately through the different nozzles, and into the different reservoirs. Partitions 10, 11 are provided between adjacent inlet reservoirs 12, 13, 14. This inhibits movement of sealant between inlet reservoirs and facilitates the deposition of films of well-defined and uniform width. Lateral walls 40, 41 inhibit loss of sealant from the inlet reservoirs, and therefore facilitate the deposition of films of well-defined and uniform widths.

As mentioned above, applicator 1 comprises three sealant-contact surfaces 5, 6, 7. Each of said sealant-contacting surfaces is provided by a respective baffle 15, 16, 17. Each sealant-contacting surface 5, 6, 7 comprises a curved portion 5*a*, 6*a*, 7*a* that extends to a flat portion 5*b*, 6*b*, 7*b*. The front-most two of those flat portions 5*b*, 6*b* are provided with sets 8, 9 of squat projections (some of which are labelled 8*a, b, c*, 9*a*, 9*b*, 9*c*) for contacting the surface on which the film is to be deposited, and for maintaining the respective sealant-contacting surfaces in spaced relationship with the surface on which the film is to be formed. The squat projections in this case are cuboids, though alternative projection shapes may be used. As the applicator is moved in a forwards direction, a film is formed on the surface of the workpiece. The squat projections cause furrows to be formed in the film, and this may be undesirable, not least because this may cause a film of uneven thickness. Rearmost sealant-contacting surface 7 is smooth and devoid of squat projections, and passage of this rearmost sealant-contacting surface 7 over the furrows formed by the projections projecting from the sealant-contacting surfaces 5, 6 substantially removes said furrows and produces a film of substantially uniform thickness.

Applicator 1 comprises first 22, second 23 and third 24 sub-spaces between sub-spaces between first 15 and second 16 baffles. The sub-spaces 22, 23, 24 permit the storage of sealant. Furthermore, the width of each of the sub-spaces 22, 23, 24 is essentially the same as that of the corresponding inlet reservoir. The width of first sub-space 22 is essentially the same as that of first inlet reservoir 12, the width of second sub-space 23 is essentially the same as that of second inlet reservoir 13 and the width of third sub-space 24 is essentially the same as that of third inlet reservoir 14. First divider 35 separates first 22 and second 23 sub-spaces. Second divider 36 separates second 23 and third 24 sub-spaces. Applicator 1 also comprises fourth 32, fifth 33 and sixth 34 sub-spaces between sub-spaces between second 16 and third 17 baffles. The sub-spaces 32, 33, 34 permit the storage of sealant. Furthermore, the width of each of the sub-spaces 32. 33, 34 is essentially the same as that of the corresponding inlet reservoir. The width of fourth sub-space 32 is essentially the same as that of first inlet reservoir 12 and first sub-space 22, the width of fifth sub-space 33 is essentially the same as that of second inlet reservoir 13 and second sub-space 23, and the width of sixth sub-space 34 is essentially the same as that of third inlet reservoir 14 and third sub-space 24. Third divider 37 separates fourth 32 and fifth 33 sub-spaces. Fourth divider 38 separates fifth 33 and sixth 34 sub-spaces. The matching of the widths of the sub-spaces with the width of the respective inlet reservoir helps produce sealant films of uniform width.

The applicator 1 is formed from plastics material and is disposable.

Nozzle attachment 60 is detachable from the main body 100 of applicator 1 to facilitate cleaning of the nozzles.

Figure 3:
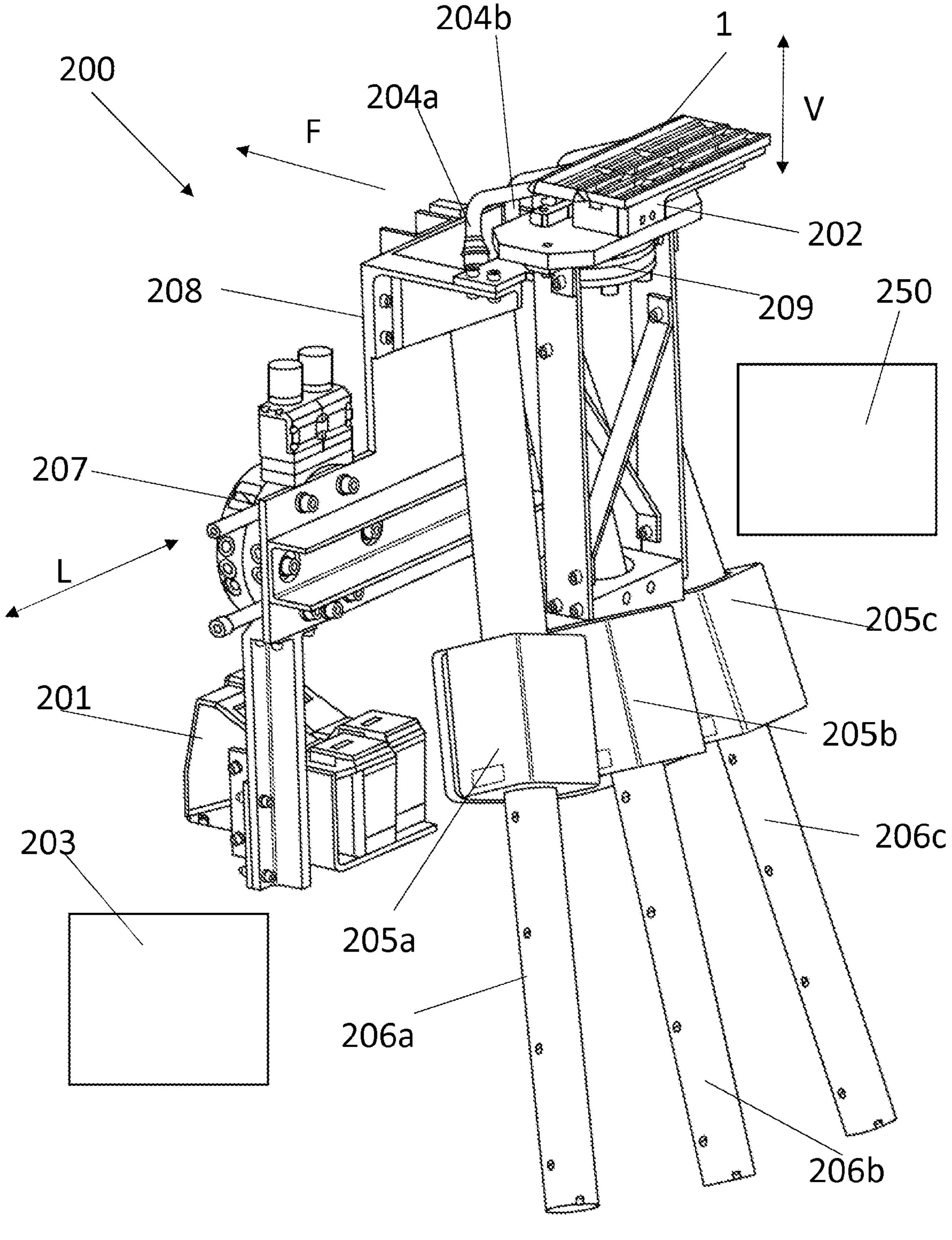
FIG. 3 shows a perspective view of an example of an embodiment of an apparatus in accordance with the third aspect of the present invention.

An example of an embodiment of an apparatus in accordance with the third aspect of the present invention will now be described by way of example only. The apparatus is denoted generally by reference numeral 200. The apparatus 200 comprises a line laser sensor 201 for sensing a width of a surface of a workpiece. Briefly, the sensor emits of line of laser radiation onto a surface on to which a film is to be formed. The direction of the line of radiation corresponds to the width of the workpiece. The radiation reflected by the surface depends on the width of the surface; a narrow surface will only reflect a narrow strip of radiation, whereas a wider surface will reflect a wider strip of radiation. This is detected by the sensor, and therefore a width of the surface is sensed. The apparatus 200 comprises an applicator mount 202 for mounting an applicator 1 for forming a film on a surface of a workpiece, such as a vehicle component. In certain embodiments, applicator mount 202 comprises, or is replaced by, a compliant material, such as foam, to facilitate further compliance. While the applicator 1 is shown in FIG. 3, the applicator 1 is not part of the apparatus 200. The applicator mount 202 (and therefore the mounted applicator 1) are moved by means 203 of moving the applicator mount 202 such that an applicator fixed to said mount is movable along a surface of a workpiece. The apparatus 200 comprises a plurality of outlets 204*a, b, c* for supplying liquid to corresponding liquid inlets provided in the applicator 1. In the present case, outlets 204*a, b, c* are configured to deliver liquid to the inlets of the applicator 1 via nozzle attachment 60, which is described above in relation to applicator 1. Each of outlets 204*a, b, c* is coupled to a conduit that is coupled to a respective applicator inlet 2, 3, 4, as described above in relation to FIGS. 1 and 2 so that liquid can be delivered selectively to inlets 2, 3, 4 of the applicator, and therefore different widths of film can be formed on a surface of a workpiece. The apparatus 200 comprises three liquid supply means 205*a, b, c* for moving liquid from a respective source of liquid 206*a, b, c* to said outlets 204*a, b, c*. In the present case, each liquid supply means 205*a, b, c* comprises a pump for pumping the liquid from the respective source of liquid 206*a, b, c* to the applicator 1. The apparatus 200 is configured to supply liquid to one or more of the plurality of outlets 204*a, b, c* dependent on a sensed width of a surface of the workpiece as determined by line sensor 201.

Applicator mount 202 is in the form of a plate and is configured to securely mount the applicator 1. Applicator mount 202 is coupled to a biasing means 209, which is provided by a Zimmer RP80P compliance unit. The compliance unit may optionally provide an applicator mount in that the applicator may be mounted to the compliance unit without the plate shown in FIG. 3. The biasing means 209 ensures that the applicator 1 maintains contact with the surface of the workpiece at all times, and mitigates against any misalignment of the applicator 1 relative to the workpiece 1. Furthermore, the biasing means 209 ensures that the force between the applicator 1 and workpiece is not excessive. The biasing means 209 may be optimised to ensure constant contact between the applicator 1 and workpiece, without there being too high a contact force that may damage one or both of the applicator 1 and the workpiece.

The compliance unit is coupled to the L-shaped bracket 208 so that movement of the L-shaped bracket 208 causes movement of the compliance unit. In this connection, motor 207 is configured to move the L-shaped bracket 208 and compliance unit (and therefore the applicator mount 202 and the mounted applicator 1) in a lateral direction (shown by the double headed arrow L in FIG. 3) in order to line-up the applicator mount 202 (and therefore any mounted applicator 1) with a workpiece so that it is in position for deposition. Motor 207 is also configured to move the L-shaped bracket 208 and the compliance unit (and therefore the applicator mount 202 and the mounted applicator 1) in a vertical direction (shown by the double headed arrow labelled V) to move the applicator into, and out of, contact with a workpiece surface.

Means 203 comprises a motor (not shown) and is used to move not only the applicator mount 202, but all the other components that are directly or indirectly coupled to the applicator mount 202, such as the laser line sensor 201, liquid outlets 204*a, b, c*, liquid supply means 205*a, b, c*, sources of liquid 206*a, b, c*, biasing means 209 and the motor 207 for moving the applicator 1 into lateral alignment with the workpiece and for moving the applicator 1 into contact with said surface.

Figure 4:
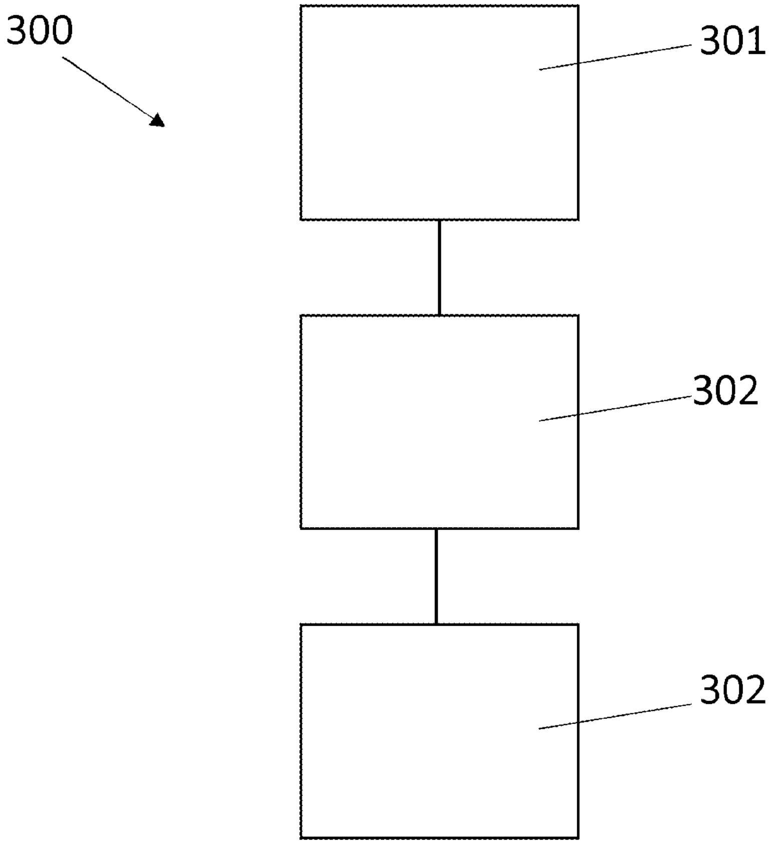
FIG. 4 shows a schematic representation of an example of an embodiment on a method of depositing sealant in accordance with the second aspect of the present invention.

Operation of the apparatus 200 and an example of a method 300 according to an embodiment of a second aspect of the present invention will be described with reference to FIGS. 1, 2, 3 and 4, but in particular with reference to FIGS. 3 and 4. A control module 250 is configured to control the operation of apparatus 200. Control module 250 is configured to control operation of laser line sensor 201, liquid supply means 205*a, b, c*, motor 207 for moving the applicator 1 into lateral alignment with the workpiece and for moving the applicator 1 into contact with said surface and means 203 of moving the applicator mount 202 such that an applicator fixed to said mount is movable along a surface of a workpiece. Operation of the apparatus 200 will now be described. Control module 250 is used to control operation of motor 207 to move the applicator 1 into a starting position and a correct alignment relative to the workpiece. Motor 207 is used to urge the applicator 1 into engagement with the surface of the workpiece. A sensor (not shown) is used to measure the distance to the contact surface onto which the sealant is to be deposited. This distance may then be used to infer a contact force.

Apparatus 200 is configured to sense 301 the width of a portion of surface of the workpiece in front of the applicator 1. In this connection, the laser line sensor 201 is located forwards of applicator 1, the "forwards" direction being defined by the intended direction of movement of the applicator 1 as shown by the arrow labelled F. Control means 250 is in communication with laser line sensor 201, and senses a width of a portion of the surface of the workpiece a known distance ahead of the applicator 1. The sensed width of said portion of the surface is used to determine the width of the film that is to be formed on the surface of the workpiece. For example, if the sensed width of said portion of the surface is wide and therefore it is desirable to form a wide film on said portion, control means 250 activates liquid supply means 205*a, b, c* so that liquid is transferred through liquid outlets 204*a, b, c* to applicator inlets 2, 3, 4 into applicator reservoirs 12, 13, 14 and deposited 302 onto the workpiece surface. Movement 303 of the applicator 1 in a forwards direction causes sealant-contacting surfaces 5, 6, 7 to pass over the liquid, forming a wide film.

If the laser line sensor 201 senses 301 a narrowing of the workpiece at a second portion of the surface of the workpiece, then it may be desirable to deposit a narrower film on the surface of the workpiece. As the applicator passes the second portion of the surface of the workpiece, control means 250 activates liquid supply means 205*a* only that liquid is transferred through liquid outlet 204*a* only to applicator inlets 2 only into applicator reservoir 12 only, and is deposited 302 onto the surface of the workpiece. Movement 303 of the applicator 1 in a forwards direction causes sealant-contacting surfaces 5, 6, 7 to pass over the liquid, forming a narrow film having a width primarily determined by the width of applicator reservoir 12.

The apparatus 200 may therefore be used to deposit liquid films of different widths without having to predetermine the shape, size and/or geometry of the surface of the workpiece, and without having to use the predetermined shape, size and/or geometry of the surface of the workpiece to control the movement of the applicator.

Whilst the present invention has been described and illustrated with reference to particular embodiments, it will be appreciated by those of ordinary skill in the art that the invention lends itself to many different variations not specifically illustrated herein. By way of example only, certain possible variations will now be described.

The applicator in the examples above is described as having three inlets and three inlet reservoirs to facilitate deposition of films of different widths. Other arrangements are possible. For example, the applicator need not have inlet reservoirs at all. In this connection, the controlled deposition of sealant through any of plurality of inlets may be used to deposit different widths of sealant onto a surface without providing the sealant into an inlet reservoir. That sealant is then transformed into a film by moving the applicator over the sealant. Alternatively or additionally, the rate of supply of sealant to the applicator may define the width of sealant deposited onto a surface, and therefore the width of the film produced from that sealant.

The examples above illustrate the present invention in relation to the processing and manufacture of workpieces in the form of aircraft components. Those skilled in the art will realise that the present invention may be used with other workpieces.

The sensors used to sense a width of the surface of the workpiece are line lasers. Those skilled in the art will realise that other sensors may be used.

The method of forming a film described above uses an applicator. Those skilled in the art would realise that this need not be the case. In the event that an applicator is used in the method of forming a film, it need not be the same applicator as that described above.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. An applicator for the deposition of sealant onto a surface of a workpiece, the applicator comprising:

at least one inlet for depositing sealant on the surface of the workpiece or a nozzle-receiving space for receiving a nozzle comprising at least one inlet for depositing sealant on to a surface;

at least one sealant-contacting surface for contacting sealant deposited onto the surface through the inlet as the applicator is moved across said surface, thereby forming a film of sealant on said surface;

at least one spacer for contacting the surface onto which sealant is to be deposited and for maintaining the sealant-contacting surface in spaced relationship with the surface;

wherein the applicator is configured to facilitate the formation of films of different widths;

wherein the at least one inlet is a plurality of inlets;

wherein the applicator comprises a plurality of inlet reservoirs for receiving the sealant; wherein the plurality of inlet reservoirs is configured to facilitate the formation of films of different widths; and, wherein at least one of the plurality of inlet reservoirs has an open face for placement proximate to the surface on to which the sealant is to be deposited, and is configured to provide a covered space for the receipt of sealant when the at least one spacer for contacting the surface of the workpiece onto which sealant is to be deposited is in contact with the surface of the workpiece, such that at least a portion of the applicator is in contact with sealant received in the covered space.

2. The applicator according to claim 1, wherein the at least one inlet is a plurality of inlets configured to facilitate the formation of films of different widths, and wherein the plurality of inlets are arranged laterally across the applicator.

3. The applicator according to claim 1, wherein the at least one inlet is elongate, a long axis of the inlet being normal to the intended direction of motion of the applicator, and configured to be substantially parallel to a surface on which the film is to be deposited.

4. The applicator according to claim 1, wherein the plurality of inlet reservoirs are arranged laterally across the applicator.

5. The applicator according to claim 1, wherein adjacent inlet reservoirs are separated by a partition to inhibit movement of sealant between adjacent inlet reservoirs.

6. The applicator according to claim 1, comprising at least one overflow outlet for the egress of excess sealant from an inlet reservoir, the overflow outlet being in fluid communication with the at least one inlet reservoir.

7. The applicator according to claim 1, wherein the at least one sealant-contacting surface is a plurality of sealant-contacting surfaces, wherein more than one of the plurality of the sealant-contacting surfaces maintain the sealant-contacting surface in spaced relationship with the surface on which sealant is to be deposited, and at least one sealant-contacting surface is substantially devoid of such spacers.

8. The applicator according to claim 1, wherein the plurality of sealant-contacting surfaces is mutually spaced along a length of the applicator, a space for the collection of sealant being provided between adjacent sealant-contacting surfaces, wherein each sealant-contacting surface comprises a flat portion.

9. The applicator according to claim 1, wherein at least one sealant-contacting surface is provided by a baffle, wherein at least one baffle comprises a curved surface and a flat surface configured to be adjacent to a surface on which sealant is to be deposited.

10. A method of forming a film of sealant on a workpiece, the method comprising:

providing the applicator claim 1;

sensing a width of the surface of the workpiece; and contacting sealant with the surface.

11. A method according to claim 10 in which the workpiece is a vehicle component, such as an aircraft component.

12. A method according to claim 10 comprising sensing a width of the surface using electromagnetic radiation.

13. A method according to claim 10 in which the surface of the workpiece face substantially downwards, and the method comprises use of, the applicator used in an inverted orientation, and in which contacting sealant with the surface comprises at least partially filling an inlet reservoir with liquid.

14. A method according to claim 13, wherein the applicator is maintaining the sealant-contacting surface in spaced relationship with the surface, the method comprising urging the one or more spacers into contact with the surface onto which a film is to be deposited and maintaining contact between the one or more spacers and the surface onto which a film is to be deposited.

15. An apparatus for forming a film of sealant on a surface of a workpiece, the apparatus comprising:

the applicator of claim 1;

one or more sensors for sensing a width of a surface of a workpiece; and, an applicator mount for mounting the applicator.

16. An apparatus according to claim 15 in which at least one of the sensors is configured so that the sensors move as a mounted applicator moves.

17. An apparatus according to claim 15 in which at least one of the sensors is operable to emit electromagnetic radiation and sense electromagnetic radiation, the sensed radiation determining a width of the surface and/or the apparatus comprises a biasing means for urging a mounted applicator into contact with a surface on to which a film is to be formed.

18. The applicator according to claim 7, wherein the space is provided with one or more dividers for inhibiting lateral movement of sealant within the covered space, the dividers forming a plurality of sub-spaces.

19. The applicator according to claim 1, wherein the covered space is between the plurality of inlets and the at least one sealant-contacting surface.

* * * * *